US012755908B2

(12) United States Patent
Chen et al.

(10) Patent No.: US 12,755,908 B2
(45) Date of Patent: Oct. 6, 2026

(54) KEY STRUCTURE

(71) Applicant: Acer Incorporated, New Taipei City (TW)

(72) Inventors: Hung-Chi Chen, New Taipei City (TW); Cheng-Han Lin, New Taipei City (TW); Huei-Ting Chuang, New Taipei City (TW); Shun-Bin Chen, New Taipei City (TW)

(73) Assignee: Acer Incorporated, New Taipei City (TW)

( * ) Notice: Subject to any disclaimer, the term of this patent is extended or adjusted under 35 U.S.C. 154(b) by 263 days.

(21) Appl. No.: 18/418,367

(22) Filed: Jan. 22, 2024

(65) Prior Publication Data

US 2025/0062083 A1 Feb. 20, 2025

(30) Foreign Application Priority Data

Aug. 18, 2023 (TW) ................................ 112131229

(51) Int. Cl.
*H01H 13/83* (2006.01)
*H01H 9/52* (2006.01)
*H01H 13/02* (2006.01)

(52) U.S. Cl.
CPC ............ *H01H 13/023* (2013.01); *H01H 9/52* (2013.01); *H01H 2013/026* (2013.01)

(58) Field of Classification Search
CPC ............. H01H 13/83; H01H 2219/062; H01H 2219/039; H01H 13/023; H01H 2219/06; H01H 2221/07; H01H 9/181; H01H 2219/036; H01H 2219/044; H01H 2013/026; H01H 9/16; H01H 2219/0622; H01H 2219/037; H01H 9/52; H01H 2219/04
See application file for complete search history.

(56) References Cited

U.S. PATENT DOCUMENTS

| | | | | |
|---|---|---|---|---|
| 11,205,549 | B1 * | 12/2021 | Chen ...................... | H01H 13/83 |
| 2021/0397808 | A1 | 12/2021 | Gupta et al. | |
| 2022/0163188 | A1 * | 5/2022 | Huang ................. | G02B 6/0021 |

FOREIGN PATENT DOCUMENTS

| | | |
|---|---|---|
| TW | 201432501 | 8/2014 |

* cited by examiner

*Primary Examiner* — Ahmed M Saeed
(74) *Attorney, Agent, or Firm* — JCIPRNET

(57) ABSTRACT

A key structure includes a base, an elastic member disposed on the base, a scissors structure movably disposed on the base, and a keycap module having a carrier and a light source. The carrier is detachably assembled to the scissors structure and abuts the elastic member. The light source is disposed in the carrier. The light source is electrically connected to a bottom portion of the base through a flexible circuit member penetrating the carrier, passing the scissors structure, and penetrating the base. A top portion of the carrier has light transmittance, so that light of the light source can pass through the top portion to be projected from the key structure.

6 Claims, 12 Drawing Sheets

100

KEY STRUCTURE

CROSS-REFERENCE TO RELATED APPLICATION

This application claims the priority benefit of Taiwan application serial no. 112131229, filed on Aug. 18, 2023. The entirety of the above-mentioned patent application is hereby incorporated by reference herein and made a part of this specification.

BACKGROUND

Technical Field

The disclosure relates to a key structure.

Description of Related Art

Most of today's electronic products are configured with keyboards or keys to facilitate user operations and maintain the practicality of the device. At the same time, a light source is also disposed inside the keyboard to generate light projected to the keycaps of the keyboard so as to serve as identification lighting, improve aesthetics, or enhance atmosphere of the user operation.

Taking notebook computers as an example, keyboards with light-emitting functions in the current technology as mentioned above are provided with light-emitting elements at the bottom of the keys to facilitate the projection of the light to the keycaps. However, such a method faces the problem of structural occlusion on the projection path, and the actual brightness projected to the keycaps is significantly insufficient. In addition, although there is a need to replace the keycaps in response to the use environment or conditions of the keys of the keyboard, the aforementioned light-emitting element is nevertheless still fixed at the bottom and cannot be replaced. That is, the same projection light is still projected to the replaced keycaps. Therefore, there is a significant lack of variability in the current keyboards.

SUMMARY

The disclosure provides a key structure, in which a keycap module is provided with a light source to be detachably assembled on a scissors structure along with a keycap so as to have replaceability.

A key structure of the disclosure includes a base, an elastic member disposed on the base, a scissors structure movably disposed on the base, and a keycap module having a carrier, a light source, and a flexible circuit member. The carrier is detachably assembled to the scissors structure and abuts the elastic member. The light source is disposed in the carrier. One end of the flexible circuit member is electrically connected to the light source, and another end of the flexible circuit member penetrates the carrier, passes the scissors structure, and penetrates a bottom portion of the base to be connected to the bottom portion of the base. A top portion of the carrier has light transmittance, so that light of the light source passes through the top portion to be projected from the key structure.

Based on the above, the key structure has a detachable keycap module relative to the scissors structure, and the keycap module includes the light source disposed in the carrier. That is, the light source can be replaced along with the keycap module, which means that the applicability of the key assembly is expanded, and the user can adjust the keycaps of the key structure in response to the aforementioned changes as the use conditions or use environment change. For example, when a user operates a notebook computer for document processing or e-sports activities, the user can adjust or replace the keys on the keyboard according to the operation requirements to facilitate the operation and improve the atmosphere during operation. Furthermore, compared with the existing keycaps with fixed patterns, the key structure of the disclosure which allows for replacement of keycaps is apparently no longer limited to the fixed positions of the aforementioned keys and can be arranged arbitrarily, which is conducive to the convenience of using the keys.

DESCRIPTION OF THE EMBODIMENTS

Figure 1A:
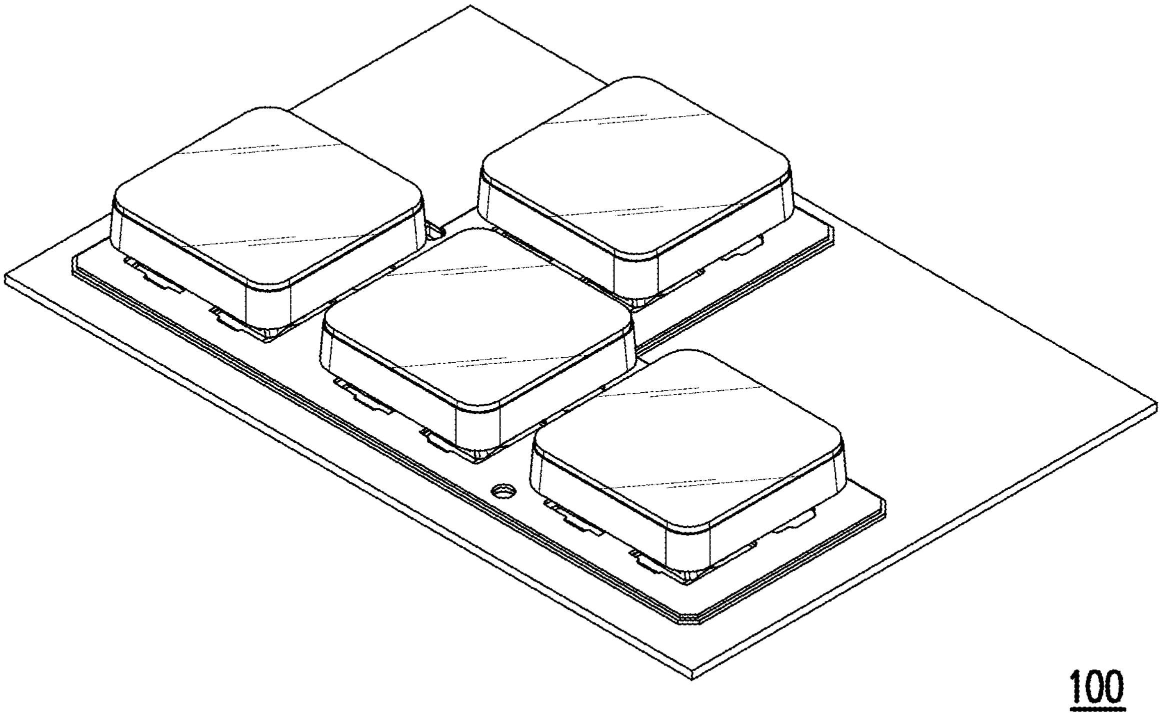
FIG. 1A is a schematic view of a key structure according to an embodiment of the disclosure.
Figure 1B:
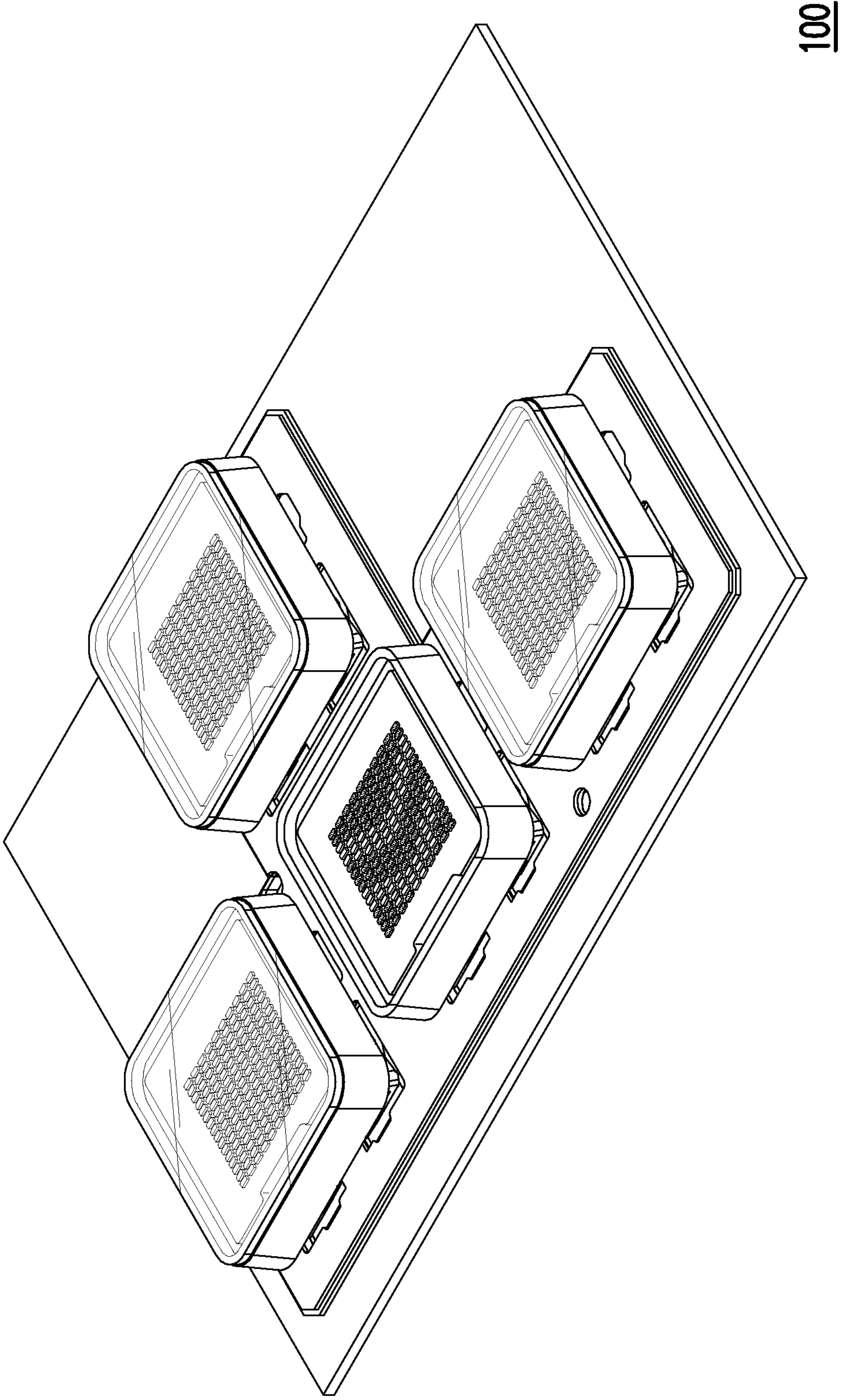
FIG. 1B and FIG. 1C are respectively light patterns generated by the key structure of FIG. 1A.
Figure 1C:
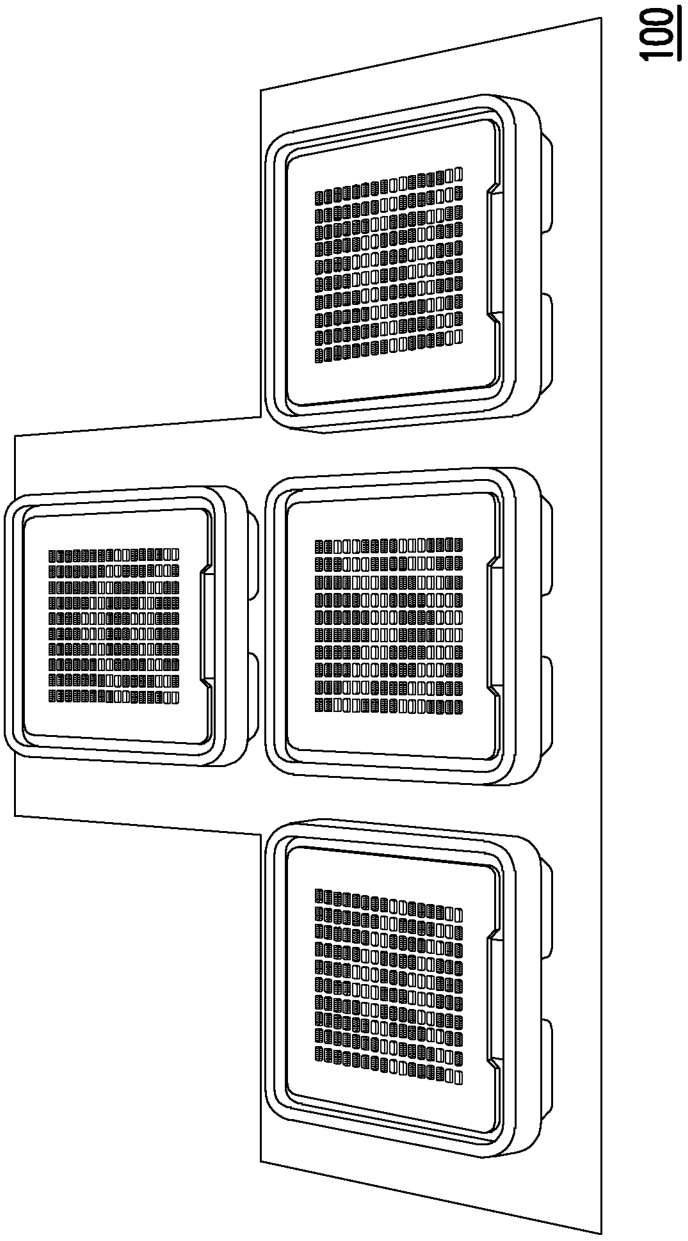

FIG. 1A is a schematic view of a key structure according to an embodiment of the disclosure. FIG. 1B and FIG. 1C are respectively light patterns generated by the key structure of FIG. 1A. Please refer to FIG. 1A, FIG. 1B, and FIG. 1C at the same time. It should be noted that a key structure 100 of the disclosure is suitable for keyboards, including keyboards for notebook computers or keyboards for desktop computers. Moreover, the key structure 100 shown in FIG. 1A to FIG. 1C is equivalent to the integration of four keys, but the disclosure does not limit the number of keys. The key structure 100 with a single key will be described in details later.

Figure 2A:
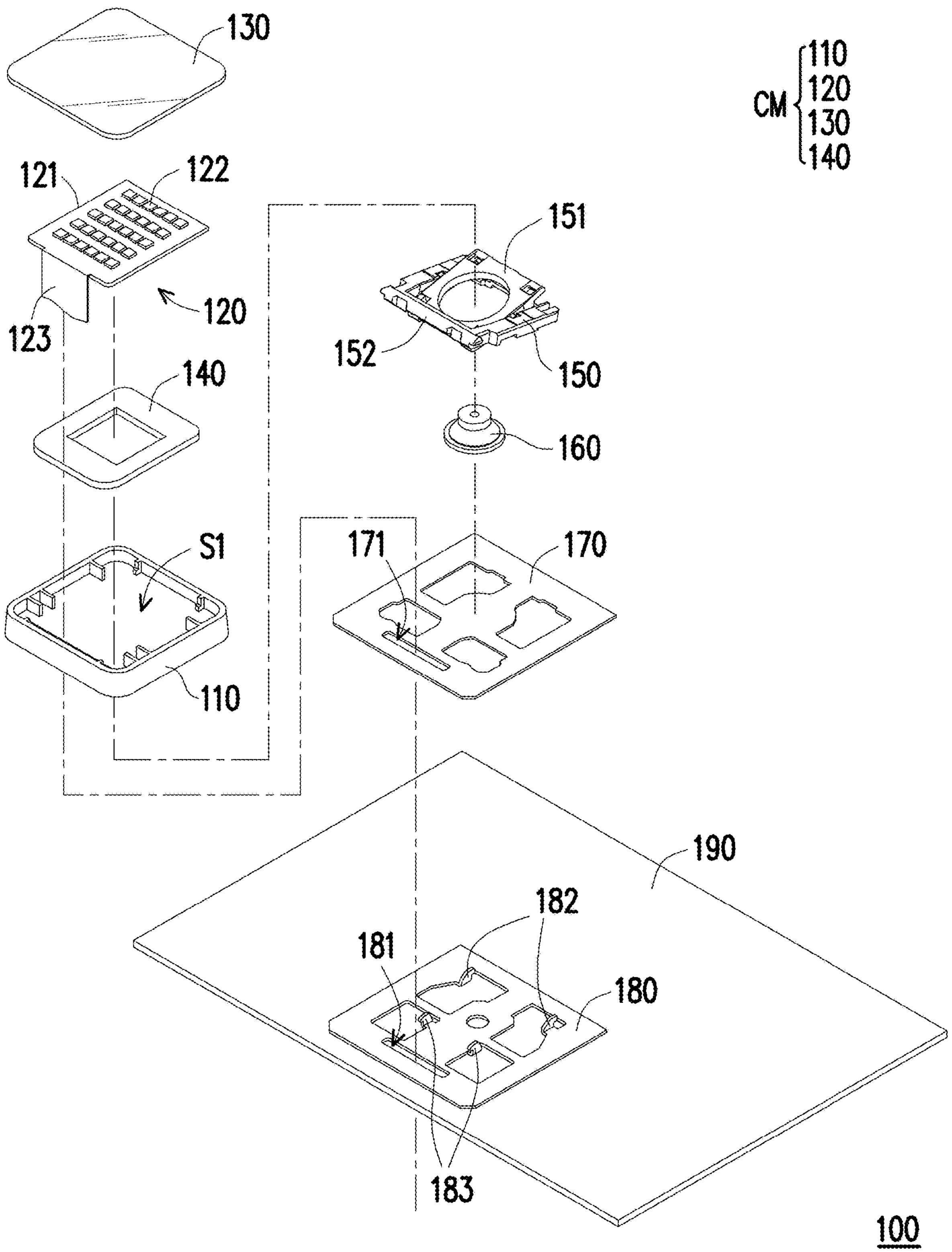
FIG. 2A is an exploded view of the key structure of FIG. 1A.
Figure 2B:
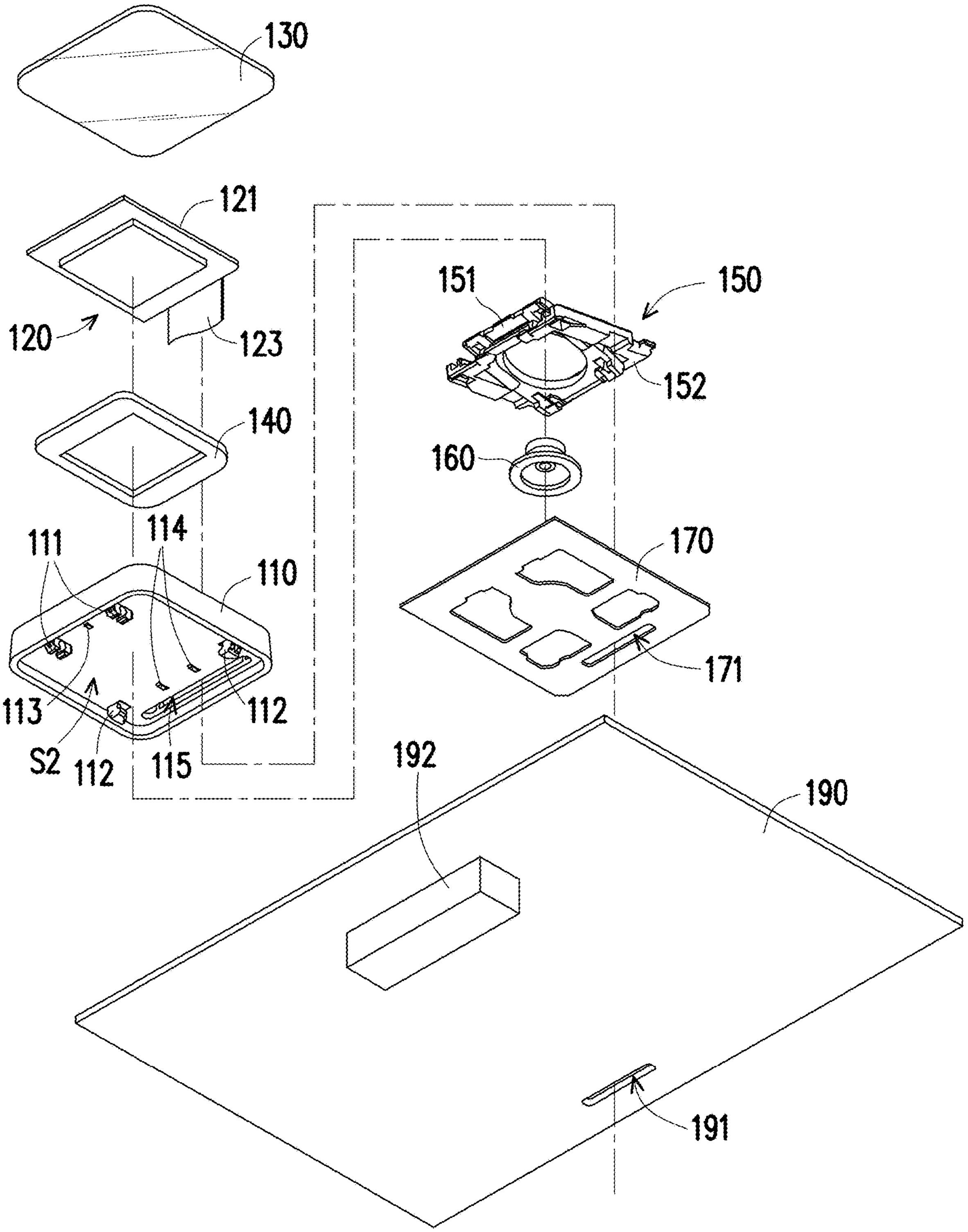
FIG. 2B is the exploded view of FIG. 2A from another perspective.
Figure 3:
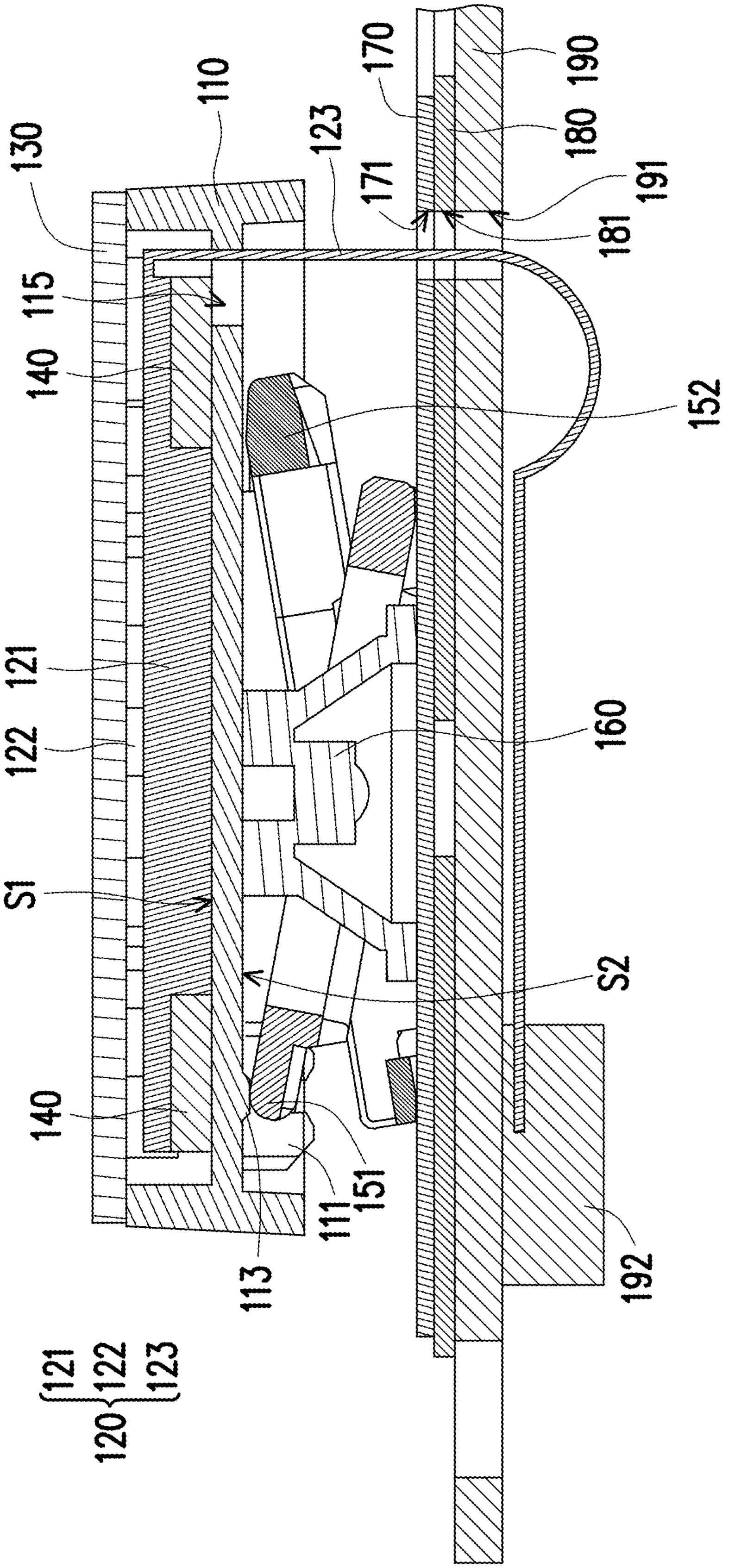
FIG. 3 is a cross-sectional view of the key structure of FIG. 2A.

FIG. 2A is an exploded view of the key structure of FIG. 1A. FIG. 2B is the exploded view of FIG. 2A from another perspective. FIG. 3 is a cross-sectional view of the key structure of FIG. 2A. Please refer to FIG. 2A, FIG. 2B, and FIG. 3 at the same time. In the embodiment, the key structure 100 includes a base, an elastic member 160, a scissors structure 150, and a keycap module CM. The base consists of a pressure-sensitive membrane 170, a bracket 180, and a circuit board 190. As shown in FIG. 1A to FIG. 1C, it can be clearly seen that the base can be designed accordingly according to the different integration states of keys to carry a plurality of keys at the same time. Therefore, the embodiment does not limit the outline of the base, which can be expanded or reduced according to the number of keys.

Furthermore, the elastic member 160 is, for example, a rubber dome, which is disposed on the base, and is particularly carried on the pressure-sensitive membrane 170. The bottom portion structure of the scissors structure 150 is movably disposed on the bracket 180 of the base, while the top portion structure of the scissors structure 150 is movably assembled to the keycap module CM. The elastic member 160 passes through the scissors structure 150, and the keycap module CM abuts the elastic member 160. It should be noted that the base, the elastic member 160, and the scissors structure 150 of the embodiment consists of the keys of the prior art. That is, the scissors structure 150 provides the keycap module CM with a straight up and straight down movement mode relative to the base. When the keycap module CM is pressed, the elastic member 160 will be driven to be deformed, and at the same time, the pressure-sensitive membrane 170 will be abutted and triggered to generate a trigger signal. Accordingly, the known features such as the actuation and triggering of the key will not be described in details here.

On the other hand, the keycap module CM of the embodiment has a carrier, a light source 120, and a heat dissipation pad 140. The carrier is detachably assembled to the scissors structure 150 and abuts the elastic member 160. The carrier of the embodiment consists of a bearing seat 110 and an upper cover 130 to accommodate the light source 120 therein. The light source 120 includes a base plate 121, a light-emitting diode array 122 (an arrangement of a plurality of light-emitting diodes is not limited here), and a flexible circuit member 123. The base plate 121 is carried on an inner bottom surface S1 of the bearing seat 110. The light-emitting diode array 122 is disposed on the base plate 121. The flexible circuit member 123 is electrically connected to the light-emitting diode array 122 and extends from the base plate 121 and passes a slot 115 of the bearing seat 110 to penetrate out of the carrier from an outer bottom surface S2. The flexible circuit member 123 is, for example, a wire, a cable, or an object with soft material characteristics and capable of power transmission, and the form thereof is not limited here. The upper cover 130 located at the top portion of the carrier has light transmittance, so that the light from the light source 120 can pass through the upper cover 130 to project from the key structure 100. The light transmittance rate of the upper cover 130 of the embodiment is greater than or equal to 30%, so that the upper cover 130 can shield or conceal to a certain extent when the light-emitting diode array 122 is not emitting light, as shown in FIG. 1B.

In addition, the heat dissipation pad 140 is carried on the inner bottom surface S1 and abuts between the bearing seat 110 and the base plate 121 to transfer the heat generated when emitting light by the light-emitting diode array 122 to the bearing seat 110. The heat dissipation pad 140 of the embodiment is made of a material with better thermal conductivity so as to dissipate the heat of the light source 120 quickly.

It should also be mentioned that the so-called "detachable" refers to a simple buckle structure, which allows the user to easily perform replacement actions under the condition that the required movement of the component can be maintained, and is adopted to effectively save the replacement process and replacement time Please refer to FIG. 2A and FIG. 2B. The scissors structure 150 includes supporting members 151 and 152 pivotally connected to each other, and the bearing seat 110 also has a plurality of C-shaped engaging portions 111 and 112. The supporting member 151 is detachably and pivotably assembled to the engaging portion 111, and the supporting member 152 is detachably and pivotably assembled to the engaging portion 112, so that the supporting members 151 and 152 can carry the keycap module CM to perform the movement mode of pressing and restoring. When the keycap module CM is to be replaced, the keycap module CM can be smoothly separated from the scissors structure 150.

In addition, the bottom portions of the supporting members 151 and 152 are pivotably assembled to the engaging portions 182 and 183 of the bracket 180, so that the scissors structure 150 can smoothly perform the aforementioned straight up and straight down movement mode.

Please refer to FIG. 2B and FIG. 3 again. In order to smoothly supply power and transmit signals to the light source 120 located in the carrier, the flexible circuit member 123 of the embodiment extends from the base plate 121 of the light source 120, and after penetrating the slot 115 of the bearing seat 110, continues down past the scissors structure 150 to sequentially penetrate a slot 171 of the pressure-sensitive membrane 170, a slot 181 of the bracket 180, and a slot 191 of the circuit board 190 to be electrically connected to an electrical connector 192 located at the bottom portion of the circuit board 190.

In addition, the bearing seat 110 of the embodiment also has a plurality of balance protrusions 113 and 114 for abutting the scissors structure 150. In detail, the balance protrusion 113 is located between the engaging portions 111 and is used to abut the supporting member 151, while the balance protrusion 114 is located between the engaging portions 112. Since the relative movement between the bearing seat 110 and the scissors structure 150 needs to be produced by the engaging portions 111 and 112, it is impossible to increase the bearing area between the two to improve the structural stability. Therefore, the balance protrusions 113 and 114 are used as the abutment between the structures between the bearing seat 110 and the scissors structure 150, which is beneficial to the stability during movement. In particular, the scissors structure 150 of the embodiment needs to cooperate with the flexible circuit member 123 to reduce the volume so as to recede the space. Therefore, in this case, the balance protrusions 113 and 114 can compensate for the potential instability caused by a reduction in the volume of the scissors structure 150 to overcome the possibility of the keycap module CM wobbling during the pressing process.

Figure 4A:
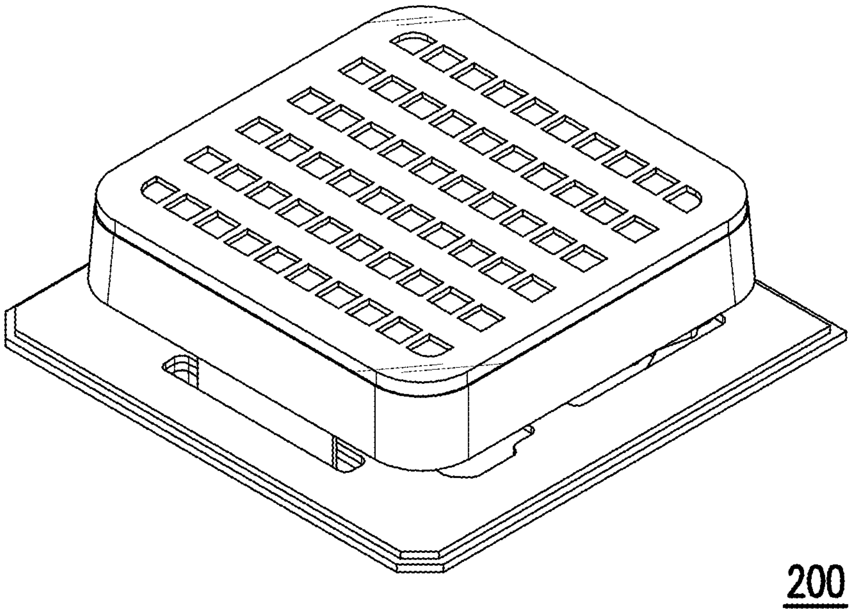
FIG. 4A is a schematic view of a key structure according to another embodiment of the disclosure.
Figure 4B:
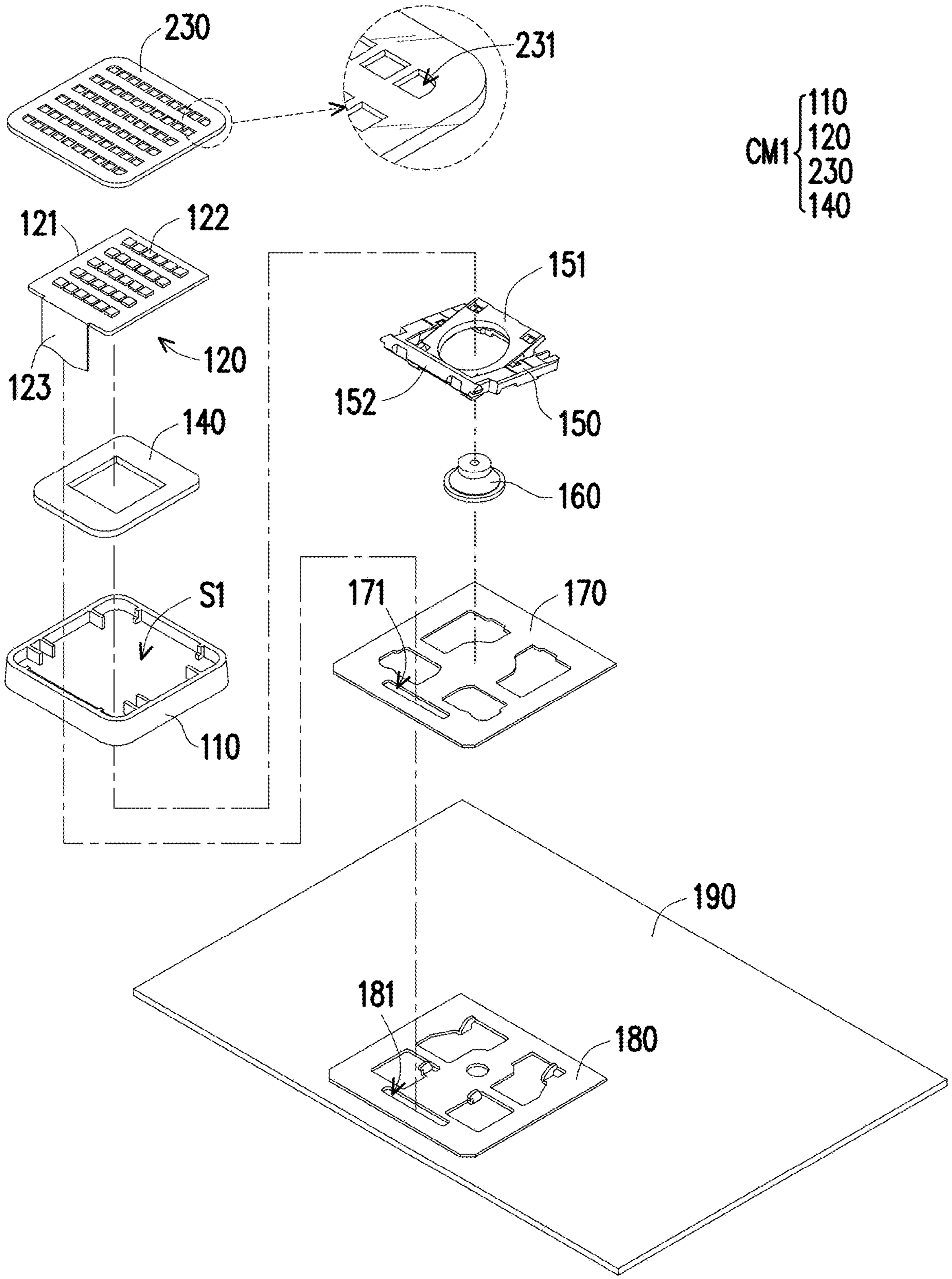
FIG. 4B is an exploded view of the key structure of FIG. 4A.

FIG. 4A is a schematic view of a key structure according to another embodiment of the disclosure. FIG. 4B is an exploded view of the key structure of FIG. 4A. Please refer to FIG. 4A and FIG. 4B at the same time. A keycap module CM1 of the embodiment includes a bearing seat 110, a light source 120, a heat dissipation pad 140, and an upper cover 230. The difference from the previous embodiment is that the top surface of the upper cover 230, that is, the surface facing away from the light source 120, has a plurality of recess 231. In addition to allowing a key structure 200 to provide the user with a sense of operation, since the upper cover 230 also has light transmittance, the recess 231 can also provide a light condensation effect, thereby strengthening the optical patterns generated by the light-emitting diode array 122.

Figure 5A:
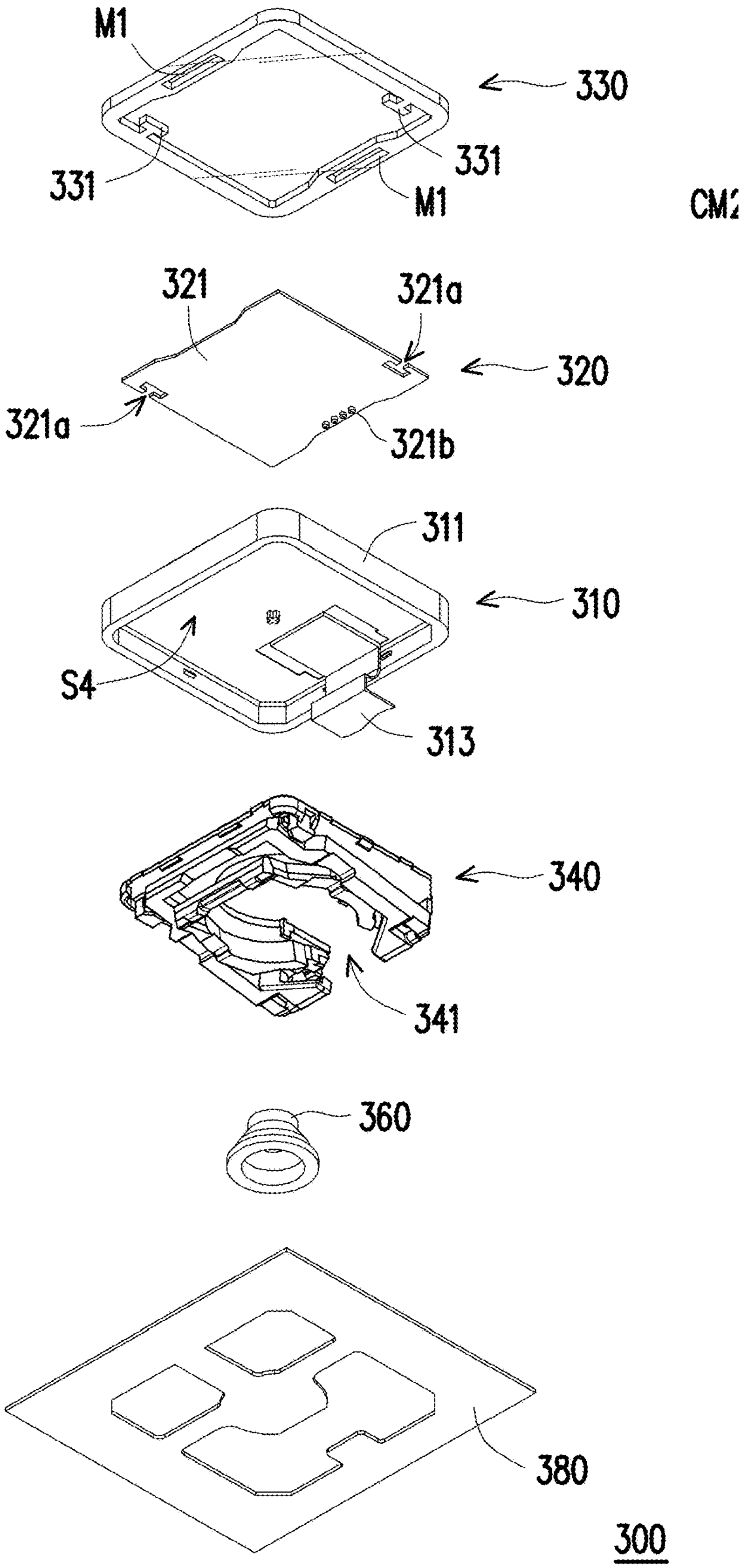
FIG. 5A is an exploded view of a key structure according to another embodiment of the disclosure.
Figure 5B:
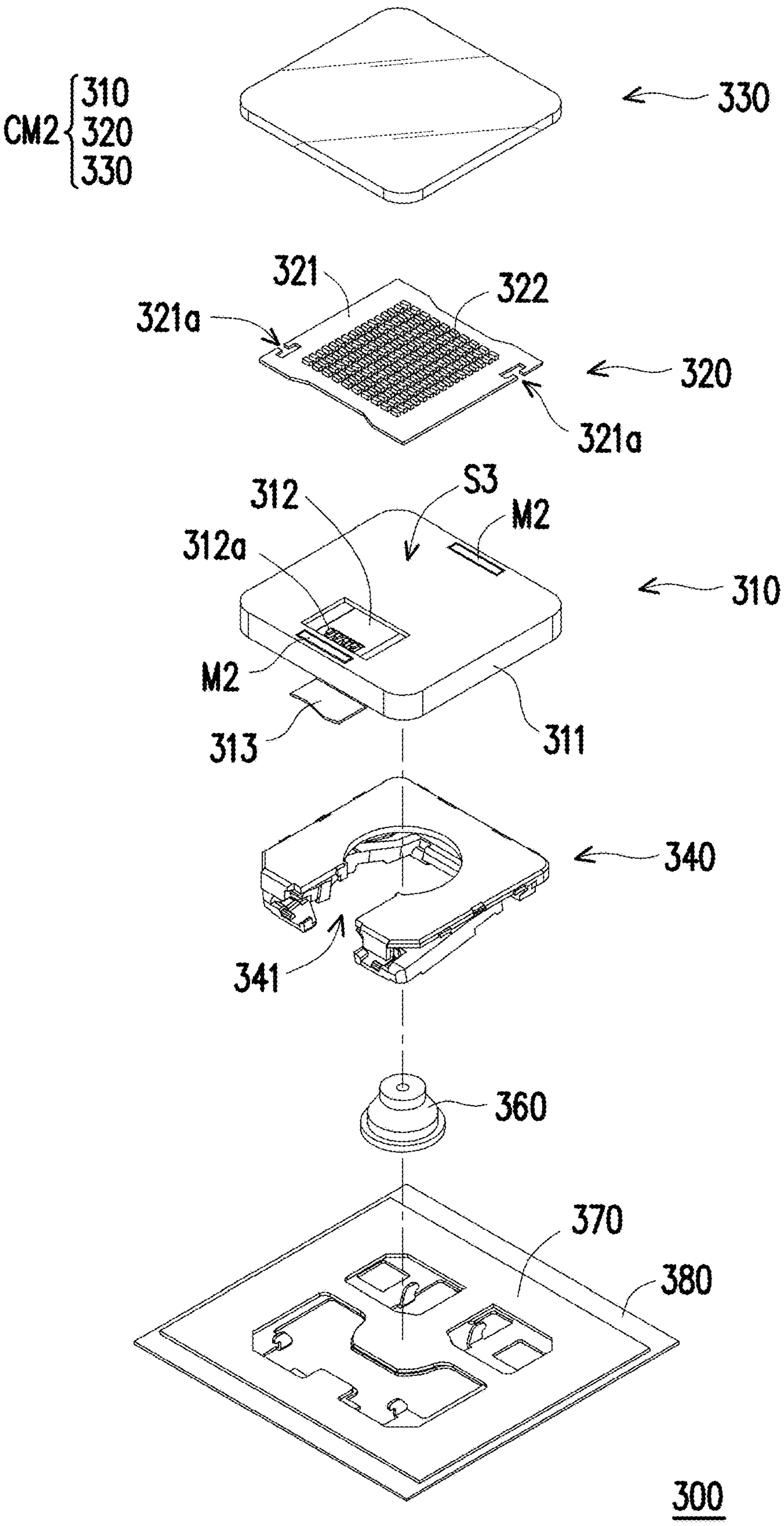
FIG. 5B is the exploded view of FIG. 5A from another perspective.
Figure 5C:
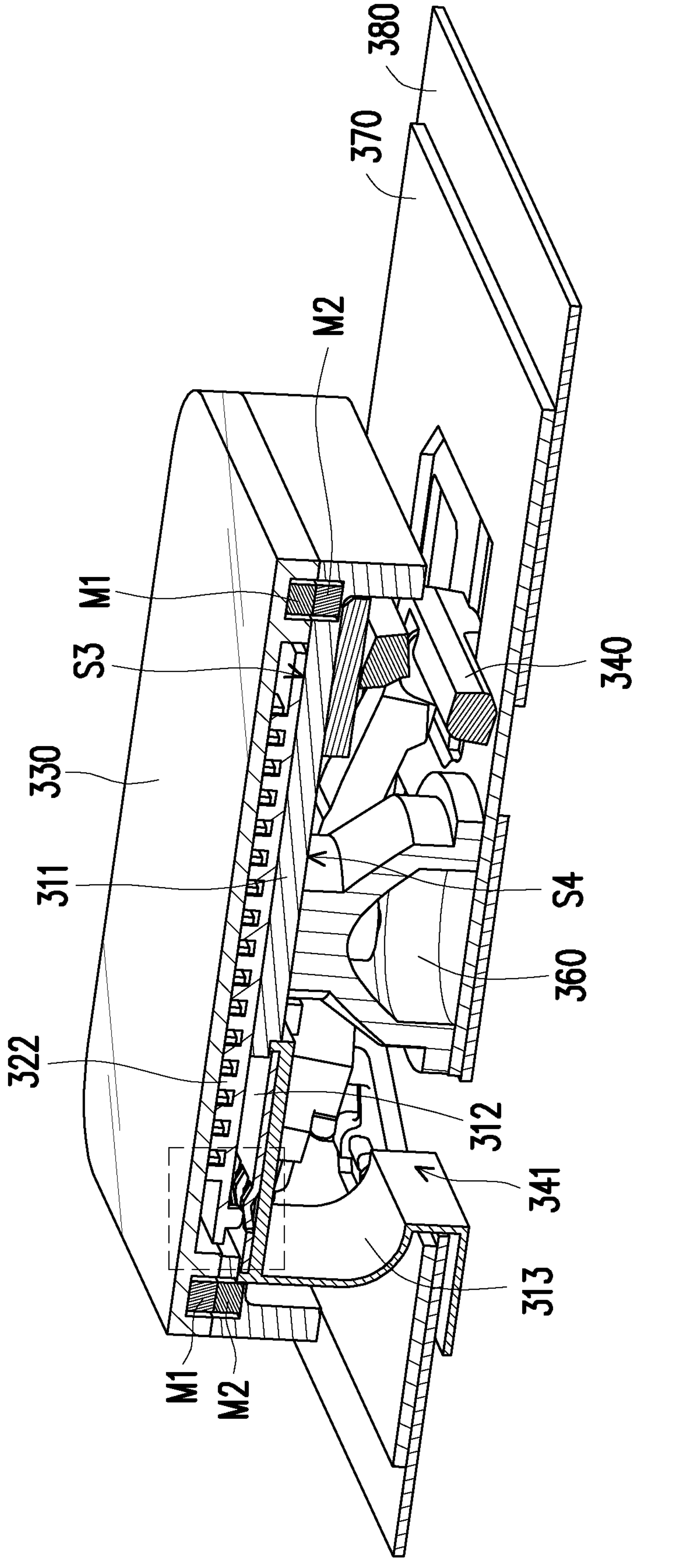
FIG. 5C is a cross-sectional view of the key structure of FIG. 5A or FIG. 5B after assembly.
Figure 5D:
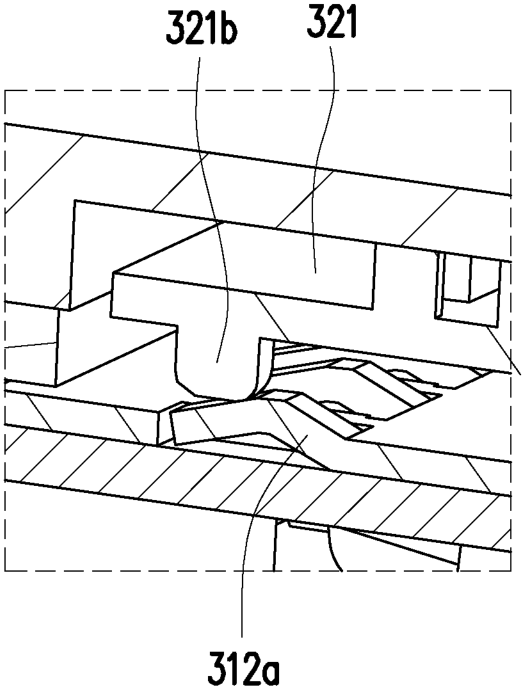
FIG. 5D is an enlarged view within the dashed box of FIG. 5C.

FIG. 5A is an exploded view of a key structure according to another embodiment of the disclosure. FIG. 5B is the exploded view of FIG. 5A from another perspective. FIG. 5C is a cross-sectional view of the key structure of FIG. 5A or FIG. 5B after assembly, and FIG. 5D is an enlarged view within the dashed box of FIG. 5C. Please refer to FIG. 5A, FIG. 5B, FIG. 5C, and FIG. 5D at the same time. It should be mentioned first that an elastic member 360, a pressure-sensitive membrane 370, and a bracket 380 are the same as those disclosed in the previous embodiment. At the same time, the embodiment omits the circuit board (as the above-mentioned circuit board 190).

In addition to the above, the carrier of the embodiment includes a bearing seat 310, an upper cover 330, and a circuit assembly. A light source 320 is assembled to the upper cover 330. The circuit assembly is disposed in the bearing seat 310. The upper cover 330 is detachably assembled to the bearing seat 310 and electrically connected to the circuit assembly during assembly. The upper cover 330 has light transmittance, so that the light generated by the light source 320 can pass through the upper cover 330 and be projected from a key structure 300.

In detail, the light source 320 of the embodiment includes a base plate 321 and a light-emitting diode array 322 disposed on the base plate 321. The upper cover 330 has light transmittance as described above, so the upper cover 330 of the embodiment can be combined with the light source 320 through a coating injection process. As shown in the exploded view, the base plate 321 has a concave structure 321*a*, and an inner edge of the upper cover 330 has a convex structure 331, so that the bonding strength between the base plate 321 and the upper cover 330 can be improved during the aforementioned coating injection process. The forms of the concave structure 321*a* and the convex structure 331 are not limited here, and in other embodiments not shown, the base plate 321 can also be modified to provide a convex structure, and the upper cover 330 can also be modified to provide a concave structure. In other words, the concave-convex structures capable of being docked and engaged with each other are conducive to the bonding strength of the light source 320 and the upper cover 330.

Moreover, the key structure 300 also includes magnetic coupling members M1 and M2, which are disposed in the upper cover 330 and the bearing seat 310 respectively, so that the upper cover 330 and the bearing seat 310 can be assembled together through magnetic attraction, and at the same time, the user can easily remove the light source 320 and the upper cover 330 from the bearing seat 310 when the key is to be replaced.

In addition, the circuit assembly of the embodiment includes a circuit board 312, a plurality of conductive elastic pieces 312*a*, and a flexible circuit member 313. The circuit board 312 is disposed inside the bearing seat 310. The conductive elastic piece 312*a* is exposed from a top portion S3 of the bearing seat 310. The flexible circuit member 313 penetrates out (protrudes) from a bottom portion S4 of the bearing seat 310. Correspondingly, the aforementioned light source 320 also has a plurality of conductive convex portions 321*b* on the bottom surface thereof, so that when the upper cover 330 is assembled and stacked on the top portion S3 of the bearing seat 310, the conductive convex portion 321*b* abuts to be electrically connected to the conductive elastic piece 312*a*, and the light-emitting diode array 322 is electrically connected to the conductive elastic piece 312*a* through the base plate 321 and the conductive convex portion 321*b* to be electrically connected to the circuit board 312 and the flexible circuit member 313. After penetrating out from the bottom portion S4 of the bearing seat 310, similar to the previous embodiment, the flexible circuit member 313 passes an escape space 341 of the scissors structure 340 and an opening structure of the pressure-sensitive membrane 370 and the bracket 380, and then smoothly connects to the circuit board of the base as in the aforementioned embodiments.

To sum up, in the above-mentioned embodiments of the disclosure, the key structure has the keycap module that can be disassembled relative to the scissors structure, and the keycap module includes the light source disposed in the carrier. That is, the light source can be replaced along with the keycap module. In an embodiment, the keycap module is assembled or disassembled with the scissors structure through a detachable structure. In another embodiment, the keycap module integrates the light source thereof with the upper cover, and uses the bearing seat and the flexible circuit member as other components. At the same time, the upper cover and the bearing seat are combined together through simple means, such as magnetic attraction, which facilitates the disassembly by the user. In other words, the partial components including the light source in the keycap module are assembled or disassembled to achieve the replaceable effect mentioned above.

Based on the above, the detachable keycap module means that the applicability of the key structure is expanded. That is, as the use conditions or use environment change, the user can adjust the keycap of the key structure in response to the aforementioned changes. For example, when a user operates a notebook computer for document processing or e-sports activities, the keys on the keyboard can be adjusted or replaced according to the operation requirements to facilitate the operation and improve the atmosphere during operation. Furthermore, compared with the existing keycaps with fixed patterns, the key structure of the disclosure which allows for replacement of keycaps is apparently no longer limited to the fixed positions of the aforementioned keys and can be arranged arbitrarily, which is conducive to the convenience of using the keys.

What is claimed is:

1. A key structure, comprising:

a base;

an elastic member, disposed on the base;

a scissors structure, movably disposed on the base; and a keycap module, having a carrier and a light source, wherein the carrier is detachably assembled to the scissors structure and abuts the elastic member, the light source is disposed in the carrier, the light source is electrically connected to a bottom portion of the base through a flexible circuit member penetrating the carrier, passing the scissors structure, and penetrating the base, and a top portion of the carrier has light transmittance so that light from the light source can pass through the top portion to be projected from the key structure, wherein the carrier comprises a bearing seat and an upper cover, the light source is disposed inside the bearing seat, the upper cover is assembled to the bearing seat to cover the light source, the flexible circuit member penetrates the bearing seat, and the upper cover has light transmittance, wherein the key structure further comprises a heat dissipation pad disposed in the bearing seat and configured to transfer heat generated by the light source to the bearing seat.

2. The key structure according to claim 1, wherein a bottom portion of the bearing seat has a plurality of engaging portions, and the scissors structure is pivotably locked in the engaging portions.

3. The key structure according to claim 1, wherein portion of the bearing seat further has a plurality of balance protrusions abutting the scissors structure.

4. The key structure according to claim 1, wherein the light source is a light-emitting diode array.

5. The key structure according to claim 1, wherein the light transmittance of the top portion is greater than or equal to 30%.

6. The key structure according to claim 1, wherein the base comprises a circuit board, a bracket, and a pressure-sensitive membrane sequentially stacked, the elastic member is located on the pressure-sensitive membrane, and the scissors structure is movably assembled to the bracket.

* * * * *